J. N. GRAVES.
RECEPTACLE WASHER AND POLISHER.
APPLICATION FILED MAR. 26, 1910.
977,385.
Patented Nov. 29, 1910.
2 SHEETS—SHEET 1.
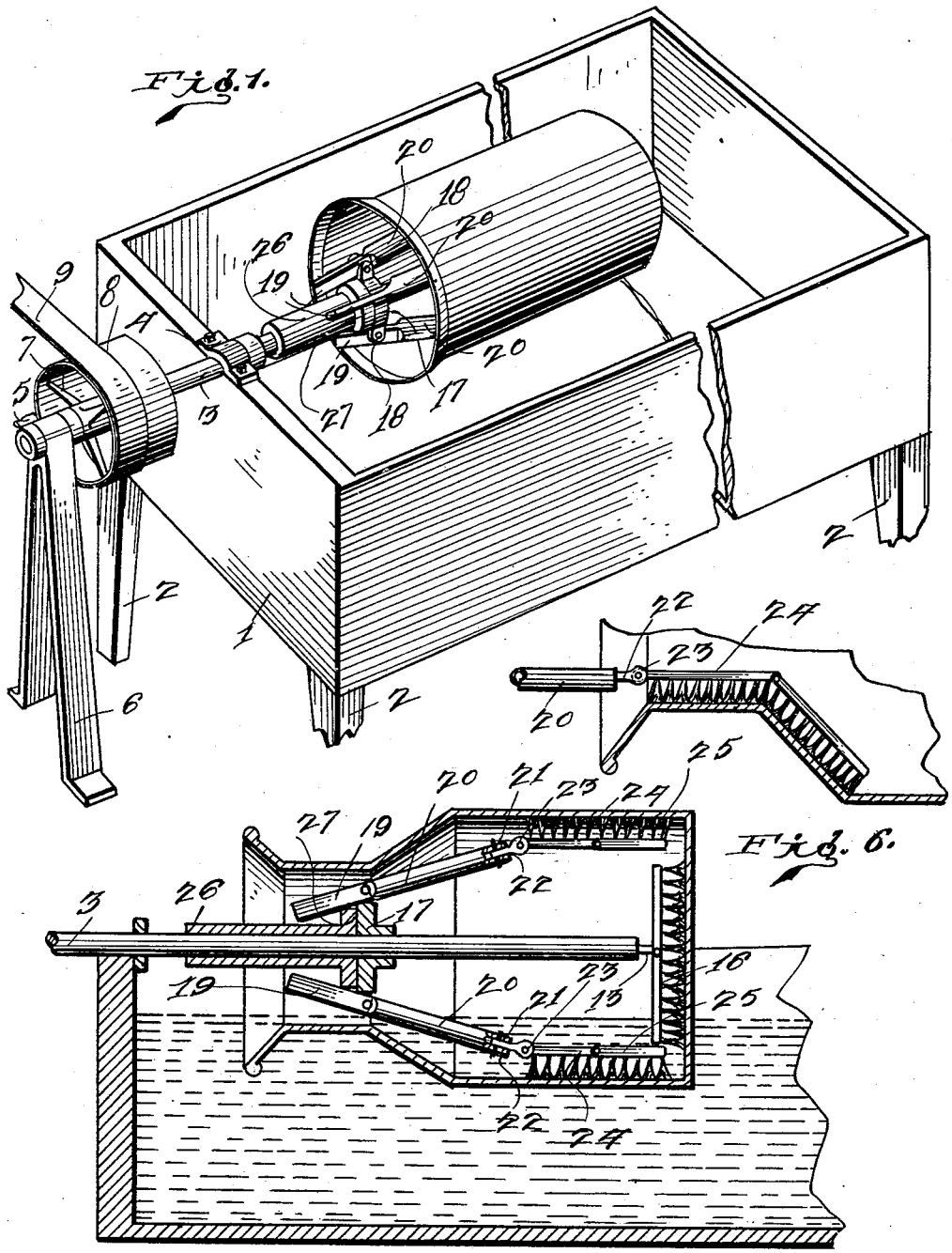

J. N. GRAVES.
RECEPTACLE WASHER AND POLISHER.
APPLICATION FILED MAR. 26, 1910.
977,385.
Patented Nov. 29, 1910.
2 SHEETS—SHEET 2.
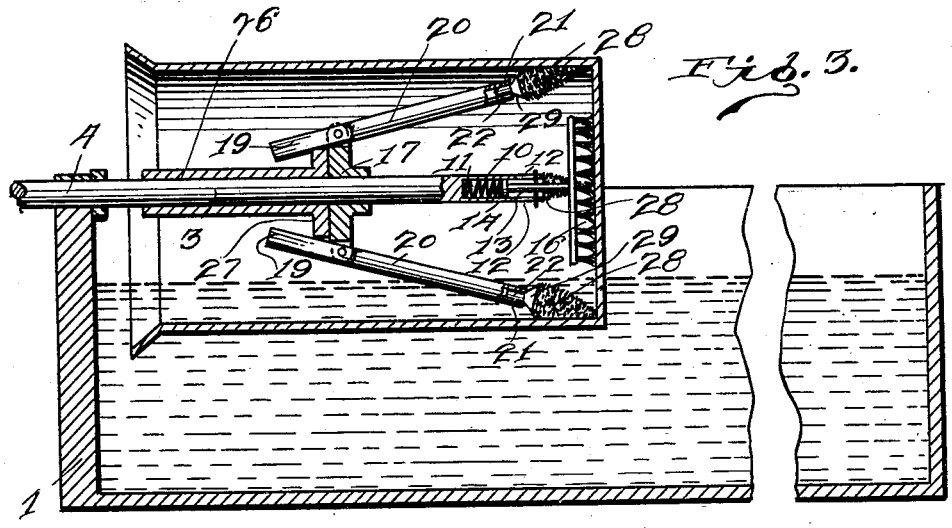
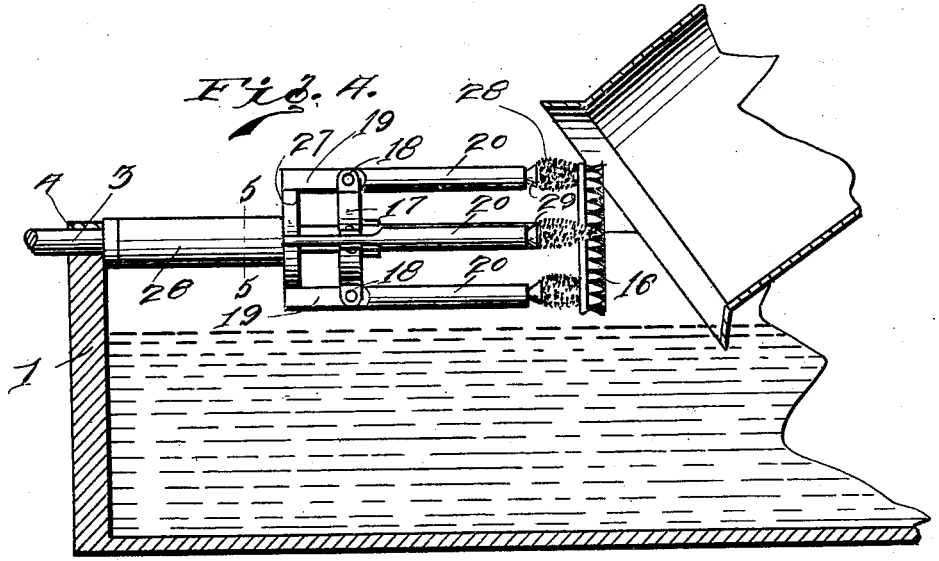
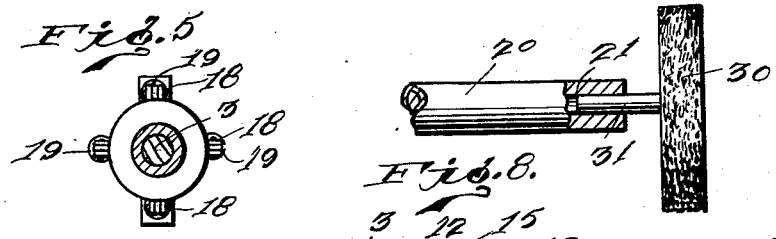
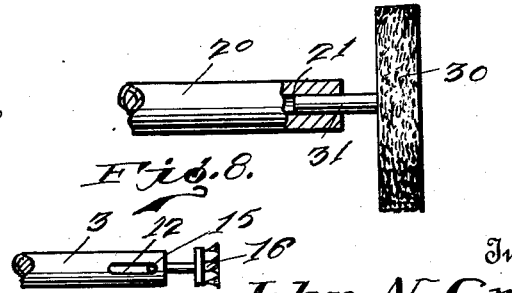
Witnesses
Inventor
John N. Graves.
By E. E. Vrooman
his Attorney.

UNITED STATES PATENT OFFICE.

JOHN N. GRAVES, OF OKLAHOMA, OKLAHOMA.

RECEPTACLE WASHER AND POLISHER.

977,385.  Specification of Letters Patent.  Patented Nov. 29, 1910.

Application filed March 26, 1910. Serial No. 551,749.

*To all whom it may concern:*

Be it known that I, JOHN N. GRAVES, a citizen of the United States of America, residing at Oklahoma, in the county of Oklahoma and State of Oklahoma, have invented certain new and useful Improvements in Receptacle Washers and Polishers, of which the following is a specification, reference being had therein to the accompanying drawing.

This invention relates to machines for cleaning and polishing receptacles such as ice cream cans, milk cans, and the like, and the principal object of the same is to provide a novel arrangement of brushes and polishers and supporting means therefor so that said brushes and polishers may be readily swung to an operative or inoperative position, the supports for the brushes and polishers being adapted to readily permit removal of the same so that they are interchanged, or new ones substituted when necessary or desirable.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a perspective view of the improved cleaning and polishing machine. Fig. 2 is a central fragmentary vertical sectional view, the driving means being omitted. Fig. 3 is a view similar to Fig. 2, showing the machine provided with polishing brushes. Fig. 4 is another view similar to Figs. 2 and 3 showing the inoperative positions of the side brushes. Fig. 5 is a sectional view taken on the line 5—5, Fig. 4. Fig. 6 is a detail fragmentary view showing the operation of the flexible side brushes. Fig. 7 is a detail fragmentary view of the brush end of the main shaft. Fig. 8 is an enlarged detail fragmentary view, partly in section, of one of the side arms, showing the manner of mounting a brush therein.

Referring to said drawings by numerals, 1 designates a tank that may be supported by the legs 2, said tank being supplied with water preferably having mixed therewith suitable antiseptic solutions. A main shaft 3 extends through a bearing 4 at one end of said tank, one portion of said shank projecting longitudinally over, and preferably parallel with, said tank, the other portion of said shaft projecting beyond said tank and having its end mounted in a bearing 5 of a standard 6. Between said standard and tank, the shaft is provided with an active pulley 7 and an idler pulley 8. A belt 9 has been shown engaged with active pulley 7, said belt being connected with a source of power not shown, so that rotary movement will be imparted to shaft 3 when said belt and pulley 7 are engaged. Obviously, by shifting the belt to pulley 8, shaft 3 will not be rotated, which arrangement obviates the necessity of stopping the source of power when the washing machine is not to be used.

The end of shaft 3 that projects over tank 1 has a longitudinal socket 10 formed in it in which a coiled spring 11 is mounted. Said end is also provided with oppositely disposed guide slots 12. A brush shank 13 has a flanged head 14 slidably mounted in said socket 10, said head being in contact with spring 11, and being slidably held in said socket by means of the transversely arranged fastening pin 15 that projects through said guide slots 12. The brush 16 carried by said shank 13 may be of bristle or any other type and is preferably circular so that it may thoroughly cleanse the usual flat bottom of a receptacle. Intermediate its socketed end, shaft 3 has an annular collar 17 fast thereon the periphery of which is provided with regularly spaced apart pivot ears 18 in each of the flattened end portions 19 of a brush carrying arm 20 is pivotally mounted. The other ends of said arms are provided with a longitudinal socket 21 for the reception of the brush shank 22, which are removably held therein by means of the transverse pins 22ª. Said shank 22 may be of the type shown in Figs. 2 and 6, its outer end being provided with an eye 23 that is pivotally connected to one end of one of the back-sections 24 of a brush, the other section 25 of said back having one end pivotally connected to the outer end of said section 24, which arrangement of back sections permits the brush to assume the necessary angular position to thoroughly cleanse the neck and shoulders of receptacles such as milk cans, as is indicated in Fig. 6.

A sleeve 26 is slidable on shaft 3 and is provided with an outstanding annular end flange 27, said sleeve being adapted to be manually moved longitudinally on shaft 3 so that its end flange 27 will contact with the flattened end of arms 20, to rock said arms to a position substantially parallel with shaft 3 so that their brushes will be in an inoperative position.

In Figs. 3 and 4, the side brushes 28 are of a cone-shape and their shanks 28ª are equipped with a beveled collar 29 that will have a wedging engagement with the sockets of the supporting arms.

In Fig. 8, an enlarged flat annular brush 30 has been shown that may be of felt or other material, its shank 31 being tightly, but removably fitted within the end socket of supporting arms.

It will be obvious that in addition to the described types of brushes others may be used, the only requirement being that the brushes have a shank that may be removably fitted in the end sockets of the arms.

In operation, sleeve 26 is moved on shaft 3 to the position shown in Fig. 4 so that its end flange will rock brush arms 20 so that their brushes will be inoperative. The receptacle to be cleaned is then placed over the brushes and sleeve 26 moved to release its flange from contact with arms 20, and power is then communicated to shaft 3 so that rotation of said shaft will throw said arms outwardly to cause their brushes to contact with, and thoroughly clean the side of the body of the receptacle.

Obviously the yieldable mounting of the brush in the end socket of shaft 3 is to permit the bottom of the receptacle to be held in firm engagement therewith while being cleaned.

What I claim as my invention is:—

1. A receptacle cleaner comprising a rotatable shaft, a brush secured to the end of said shaft, a collar secured to said shaft, brush arms pivotally secured to said collar and provided at their outer ends with longitudinally extending sockets, slots formed in the walls of said socket, a brush for each arm, said brush being provided with a shank fitting within said socket and a pin passing through said slots and through said shank to retain said brush in place.

2. A receptacle cleaner comprising a rotatable shaft, a brush secured to the end of said shaft, a collar rigidly secured to said shaft, brush arms pivotally connected to said collar, brushes secured to the outer ends of said arms, a sleeve slidably mounted upon said shaft and provided with a flange adapted to be brought into contact with the ends of said arms to limit the outward swing of said arms due to their rotation.

3. A receptacle cleaner comprising a rotatable shaft, a collar secured to said shaft, brush arms pivotally connected to said collar, a brush secured to the outer end of each arm, each of said brushes formed of a plurality of sections hinged together and adapted to automatically adjust themselves to the desired shape, and a means for limiting the outward swing of said arms due to their rotation.

In testimony whereof I hereunto affix my signature in presence of two witnesses.

JOHN N. GRAVES.

Witnesses:
 WALTER BOZARTH,
 R. B. WATKINS.